(12) United States Patent
Blom

(10) Patent No.: US 6,221,124 B1
(45) Date of Patent: Apr. 24, 2001

(54) FLUIDIZED BED TREATMENT OF EAF DUST

(75) Inventor: Peter William Ennis Blom, Krugersdorp (ZA)

(73) Assignee: L & C Steinmuller (Africa) (Proprietary) Limited (ZA)

(*) Notice: Subject to any disclaimer, the term of this patent is extended or adjusted under 35 U.S.C. 154(b) by 0 days.

(21) Appl. No.: 09/180,804
(22) PCT Filed: May 28, 1997
(86) PCT No.: PCT/GB97/01445
§ 371 Date: Nov. 16, 1998
§ 102(e) Date: Nov. 16, 1998
(87) PCT Pub. No.: WO97/45564
PCT Pub. Date: Dec. 4, 1997

(30) Foreign Application Priority Data

May 28, 1996 (ZA) .................................................. 96/4314
Dec. 6, 1996 (ZA) .................................................. 96/10290

(51) Int. Cl.$^7$ .................................................. C21B 13/12
(52) U.S. Cl. .................................................. 75/10.22; 75/961
(58) Field of Search .................. 75/444, 961, 10.22; 423/418.2, 108

(56) References Cited

U.S. PATENT DOCUMENTS

| | | |
|---|---|---|
| 4,396,423 | 8/1983 | Stephens, Jr. et al. .................. 75/25 |
| 4,396,424 * | 8/1983 | Yatsunami et al. .................. 75/961 |
| 4,606,761 * | 8/1986 | de Waal et al. .................. 75/10.22 |
| 4,673,431 | 6/1987 | Briemont .................. 75/25 |
| 5,162,107 * | 11/1992 | Hirsch et al. .................. 423/108 |
| 5,690,717 * | 11/1997 | Stevens et al. .................. 75/444 |
| 5,824,277 * | 10/1998 | Campos et al. .................. 423/418.2 |

FOREIGN PATENT DOCUMENTS

| | | |
|---|---|---|
| 8422211 | 7/1985 | (GB) . |
| 7173549 | 7/1995 | (JP) . |
| 9319213 | 9/1993 | (WO) . |

OTHER PUBLICATIONS

Steel Times, "Fluidized Bed Treatment of Steelplant Dust" Mar. 1992, Redhill, Surrey, GB.

Erzmetall, "Process Selection Factors for the Retreatment of Zinc–Bearing Scrap and Residues," Feb. 1991, Weinheim, DE.

* cited by examiner

Primary Examiner—Melvyn Andrews
(74) Attorney, Agent, or Firm—Ladas & Parry

(57) ABSTRACT

The invention concerns a method of treating electric arc furnace (EAF) dust. In the method the dust is preheated and decontaminated under conditions which oxidize the magnetite content of the dust to hematite. Thereafter the preheated and decontaminated dust is introduced into a fluidized bed reactor in which hematite is reduced, by means of a hot reducing gas generated by reforming natural gas in a non-catalytic plasma-arc heating process, to yield an iron-rich material suitable for recycling to the EAF, and a high grade zinc oxide product.

10 Claims, 1 Drawing Sheet

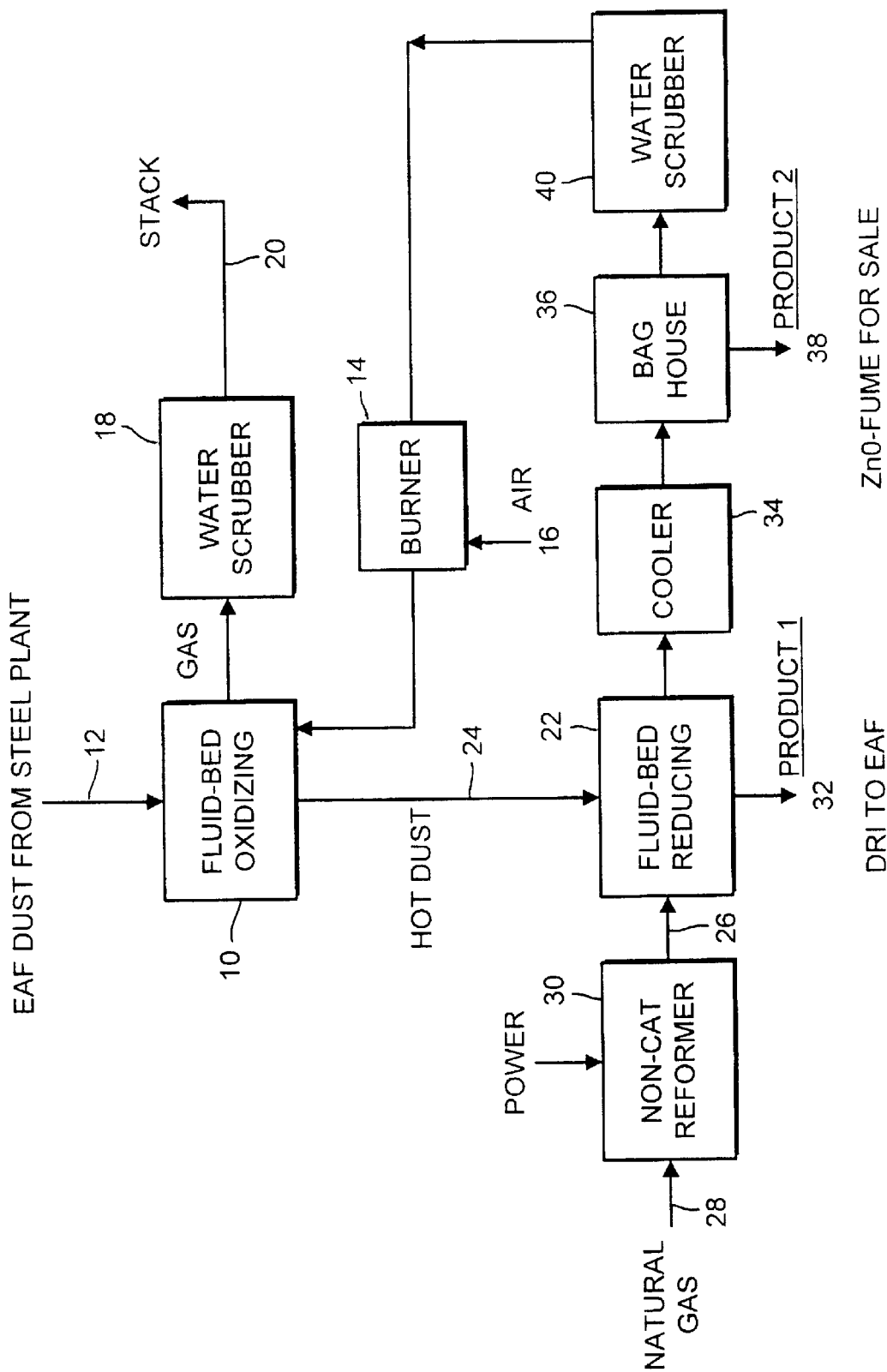
SCHEMATIC FLOW DIAGRAM OF E.A.F. - DUST PROCESS

FLUIDIZED BED TREATMENT OF EAF DUST

BACKGROUND TO THE INVENTION

This invention relates to the treatment of electric arc furnace (EAF) dust.

In general, for every ton of liquid steel that is produced in mini mills, i.e. steel mills with a capacity of the order of one million tons of liquid steel per annum, approximately 15 kg of EAF dust is produced. It is estimated that in excess of three million tons of EAF dust is produced worldwide each year by carbon steel manufacturers. The EAF dust which is produced is designated by certain authorities, such as the Enviromnmental Protection Agency in the USA, as a hazardous waste material inter alia because of high zinc content. As a result it is necessary to treat the dust rather than merely dump it, Traditionally, EAF dust is transported to a central treatment facility. One traditional treatment technique is the Waelz Kiln process operated by Horsehead Industries in the USA. However, treatment of the EAF dust in this way presents several serious problems, including the fact that the actual cost of EAF dust treatment is extremely high. This is at least partly because of the high capital cost of treatment facilities operating the process. The high capital cost means that facilities operating the process tend to have high capacities and furthermore that a single, central facility is usually provided to serve steel producers spread out over a large area. Transportation of the dust from the steel mill, often over large distances, contributes to the overall high cost of dust treatment using the process. Added to this, the hazardous nature of the dust, together with its small particle size, typically less than one micron, means that the actual transportation thereof from the steel mill to a treatment facility requires special handling measures, again increasing the overall costs of treatment.

A typical EAF dust may include the following constituents by weight:

| | |
|---|---|
| ZnO | 27% |
| PbO | 2% |
| $Fe_2O_3$ | 44% |
| C | 6% |
| Halides | 2 to 4% |
| Cd | 220 ppm |

A zinc oxide content of this magnitude can be attributable to the smelting of large amounts of galvanised scrap in the steel mill.

An objective of the present invention is to provide a method whereby EAF dust can be treated on site in an economical manner. Given the high Zn and Fe content of the typical EAF dust, another objective of the present invention is to provide for economical recovery thereof.

SUMMARY OF THE INVENTION

According to one aspect of the present invention there is provided a method of treating EAF dust, the method comprising the steps of preheating and decontaminating the dust under conditions which oxidise the magnetite content of the dust to hematite, and thereafter introducing the preheated and decontaminated dust into a fluidised bed reactor in which hematite is reduced, by means of a hot reducing gas generated by reforming natural gas in a non-catalytic plasma-arc heating process, to produce an iron-rich material suitable for recycling to the EAF.

In addition, the method may comprise the step of recovering ZnO fume (i.e. powder) from the fluidised bed reactor, typically in a bag-house/filter system located downstream of the fluidised bed reactor.

Typically, the reducing fluidised bed reactor is operated at a temperature of the order of 800° to 1000° C., preferably 850° to 1000° C., most preferably about 950° C. The hot reducing gas typically comprises a mixture of $H_2$ and CO. In the preferred method the EAF dust is initially preheated in an oxidising fluidised bed reactor, typically to a temperature of the order of 1000° C., by heat derived from off-gases produced in the reducing fluidised bed reactor.

These gases may, after passing through a water scrubber, be heated in the presence of air before being introduced into the oxidising fluidised bed reactor.

Contaminants, such as halid es and Cd, may be removed from the oxidising fluidised bed reactor through a water scrubber whereafter they may be disposed of.

BRIEF DESCRIPTION OF THE DRAWING

The invention will now be described in more detail, by way of example only, with reference to the accompanying flow diagram which illustrates the steps of an EAF dust treatment method according to the invention.

DESCRIPTION OF A PREFERRED EMBODIMENT

In the first step in the method represented by the accompanying flow diagram, EAF dust produced from an EAF steel plant is introduced into a first fluidised bed reactor 10, as indicated by the numeral 12. In the reactor 10, the EAF dust is preheated by off-gases produced in the second fluidised bed reactor, as described below The off-gases are passed through a burner 14 supplied with air 16 before being introduced into the fluidised bed reactor 10 at a temperature sufficient to preheat the EAF dust to a temperature of the order of 1000° C.

In the oxidising and elevated temperature conditions prevailing in the reactor 10, the magnetite content of the EAF dust is oxidised to hematite by the following reaction:

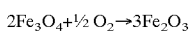

$2Fe_3O_4 + \tfrac{1}{2} O_2 \rightarrow 3Fe_2O_3$

Gases produced in the reactor 10 are withdrawn through a water scrubber 18 in which important contaminants typically present in the EAF dust, such as halides and Cd, are removed. The balance of the gas is exhausted to atmosphere through a stack as indicated by the arrow 20.

The preheated and decontaminated dust is then introduced into a second fluidised bed reactor 22 as indicated by the arrow 24. The second fluidised bed reactor is supplied with hot reducing gas along the line 26. The hot reducing gas, which is produced by reforming natural gas 28, together with steam, in an independently powered, non-catalytic plasma-arc reformer 30, comprises a mixture of $H_2$ and CO, typically approximately 75% $H_2$ and 25% CO. The non-catalytic plasma-arc reformer 30 is operated at a temperature sufficient for the production of a hot reducing gas, typically having a temperature of about 950° C., but generally in the range 800° to 1000° C. and preferably in the range 850° to 1000° C.

In practice, the non-catalytic plasma-arc reforming process which takes place in the reformer 30 makes use of a plasma heating torch, incorporating an anode and a cathode, which is connected to the reaction chamber of the reformer by a sliding valve. The natural gas ($CH_4$) is reformed stoichiometrically together with steam at very high temperatures generated by the torch, typically of the order of 15000° C., in the absence of a catalyst, according to the following reaction:

$$CH_4 + H_2O \rightarrow CO + 3H_2$$

In the reactor 22, the hematite is reduced to an iron-rich product 32, i.e. direct reduced iron (DRI), according to the following reaction:

$$2Fe_2O_3 + 3H_2 + 3CO \rightarrow 4Fe + 3H_2O + 3CO_2$$

The DRI is suitable for recycling to the EAF of the steel plant. Thus the iron content of the EAF is usefully recovered.

The ZnO and PbO in the EAF dust is reduced by the $H_2$ and CO to metal but, importantly, under the operating conditions prevailing in the reactor 22 both the Zn and Pb are in the vapour phase and are carried by the fluidising gas downstream to a cooler 34. At about 800° C. and below, the Zn back-reacts with the oxygen present to form ZnO. It is considered undesirable for the latter reaction to take place in the reactor 22 because this would lead to the possibility of mixing between the iron rich material and ZnO fume which could in turn result in low recoveries of ZnO fume and in the iron being contaminated with ZnO.

Cooling in the cooler 34 to temperatures of 800° and below thus results in the oxidation of Zn and Pb to form a ZnO-rich fume 38 which is recovered in a bag-house and filter system 36. The fume 38 is a high grade, zinc oxide-rich powder with a low halide content. This fume is suitable for resale to primary electrolytic zinc producers. The off-gases produced by the reactor 22 are scrubbed in a water scrubber 40 and thereafter heated in the burner 14, as described above, for the purposes of preheating and decontaminating the raw EAF dust under oxidising conditions in the reactor 10.

It will be noted that the raw EAF dust is effectively converted to yield two useful products, namely a marketable ZnO-rich fume and an iron rich material which can used in the EAF steel plant, with little or no waste. Apart from the fact that the EAF dust is converted to yield useful products there is the added advantage that the process of the invention can be carried out economically in situ at the steel plant itself.

EXAMPLE

The following example describes a laboratory scale test carried out at Procedyne Corporation of New Jersey, USA using a 6 inch diameter Inconel 601 fluidised bed reactor. The EAF dust used as feed material was supplied by North Star Steel of Michigan, USA. The product samples were analysed by Mintek of South Africa. The general objective of the test was to convert EAF dust into a high grade zinc oxide product and iron rich material without substantial waste products being generated.

A specific objective of the test was to produce a high grade, dehalogenated zinc oxide product with a zinc oxide content of greater than 80% by weight and an iron rich material metallised to a level of at least 90% by weight.

The reducing fluidised bed reactor produced material having the following properties:

%ZnO (by weight)—88
%$Fe_2O_3$ (by weight)—7,8
%PbO (by weight)—0,05

It will be seen that the specific objective of a zinc oxide content of greater than 80% was successfully achieved. The product of the process can accordingly be regarded as a super high grade zinc oxide product.

Metallisation, i.e. production of metallic iron, levels of 98% were also achieved in the test. In addition dehalogenation, i.e. chloride extraction, levels of greater than 90% were achieved.

The test results indicate clearly that EAF dust can successfully be converted to yield a high grade zinc oxide product suitable for resale to, for instance, zinc smelters for the production of zinc metal, and an iron rich product suitable for recycling to the EAF itself or to other steel producers.

It is believed that the success of the method of the invention is largely attributable to the use of the hot reducing gas, generated by reforming natural gas in a non-catalytic plasma-arc reformer, in the reducing fluidised bed reactor.

What is claimed is:

1. A method of treating EAF dust, the method comprising the steps of preheating the dust under conditions to remove contaminates including halides therefrom and to oxidise magnetite contained therein to hematite, and thereafter introducing the preheated dust from which contaminants have been removed into a fluidised bed reactor in which said hematite is reduced, by means of a hot reducing gas generated by reforming natural gas in a non-catalytic plasma-arc heating process, to yield an iron-rich material suitable for recycling to the EAF.

2. The method of claim 1 and comprising the step of recovering ZnO-rich fume from the product of the fluidised bed reactor.

3. The method of claim 1 or claim 2 wherein the reducing fluidised bed reactor is operated at a temperature in the range 800° to 1000° C.

4. The method of claim 3 wherein the reducing fluidised bed reactor is operated at a temperature in the range 850° to 1000° C.

5. The method of claim 4 wherein the reducing fluidised bed reactor is operated at a temperature of about 950° C.

6. The method of claim 1 wherein the hot reducing gas comprises a mixture of $H_2$ and CO.

7. The method of claim 1 wherein the EAF dust is initially preheated in an oxidising fluidised bed reactor, by heat derived from off-gases produced in the reducing fluidised bed reactor.

8. The method of claim 7 wherein the EAF dust is preheated to a temperature of the order of 1000° C.

9. The method of claim 8 wherein the off-gases, after passing through a water scrubber, are heated in the presence of air before being introduced into the oxidising fluidised bed reactor.

10. The method of claim 1 wherein halides and Cd comprise contaminants in the in said EAF which are removed from the oxidising fluidised bed reactor through a water scrubber and are thereafter disposed of.

* * * * *